US012785252B2

(12) United States Patent
Bard et al.

(10) Patent No.: US 12,785,252 B2
(45) Date of Patent: *Nov. 3, 2026

(54) DUAL ANTENNA WIRELESS COMMUNICATION DEVICE IN A LOAD CONTROL SYSTEM

(71) Applicant: Lutron Technology Company LLC, Coopersburg, PA (US)

(72) Inventors: Benjamin F. Bard, Zionsville, PA (US); Robert Bollinger, Jr., Fogelsville, PA (US); Donald R. Mosebrook, Coopersburg, PA (US); Walter S. Zaharchuk, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/944,091

(22) Filed: Nov. 12, 2024

(65) Prior Publication Data

US 2025/0070453 A1 Feb. 27, 2025

Related U.S. Application Data

(60) Continuation of application No. 17/316,096, filed on May 10, 2021, now Pat. No. 12,166,266, which is a (Continued)

(51) Int. Cl.

*H01Q 1/22* (2006.01)
*H01Q 1/38* (2006.01)

(Continued)

(52) U.S. Cl.

CPC ............. *H01Q 1/2291* (2013.01); *H01Q 1/38* (2013.01); *H01Q 1/48* (2013.01); *H01Q 5/392* (2015.01);

(Continued)

(58) Field of Classification Search

CPC ........ H01Q 1/243; H01Q 1/38; H01Q 1/2283; H01Q 9/0421; H01Q 9/0407; H01Q 13/10;

(Continued)

(56) References Cited

U.S. PATENT DOCUMENTS 4,644,361 A 2/1987 Yokoyama
5,248,919 A 9/1993 Hanna et al.

(Continued)

FOREIGN PATENT DOCUMENTS

GB 2416246 A 1/2006
JP 2001-332930 A 11/2001

OTHER PUBLICATIONS

Antenova, "Antenna Designs for MIMO Systems", Queen Mary, University of London, 2004, 120 pages.

(Continued)

*Primary Examiner* — Wei (Victor) Y Chan
(74) *Attorney, Agent, or Firm* — Michael S. Czarnecki; Glen R. Farbanish; Philip N. Smith

(57) ABSTRACT

A wireless communication device for use in a load control system for controlling one or more electrical loads may comprise a counterpoise, a first and second antennas, a RF communication circuit and a control circuit. The two antennas may be oriented differently and spaced apart from each other. For example, the first antenna may extend perpendicularly from the counterpoise while the second antenna extends in a plane substantially parallel to the counterpoise. The first antenna may extend from the counterpoise at a point substantially central to the counterpoise while the second antenna may extend along a perimeter of the counterpoise. The RF communication circuit may transmit wireless signals via the first and second antennas. The control circuit may cause the RF communication circuit to transmit (Continued)

a first wireless signal in a first time slot and a second wireless signal in a second time slot.

14 Claims, 8 Drawing Sheets

Related U.S. Application Data division of application No. 15/337,550, filed on Oct. 28, 2016, now Pat. No. 11,005,159.

(60) Provisional application No. 62/248,762, filed on Oct. 30, 2015.

(51) Int. Cl.

| | |
|---|---|
| ***H01Q 1/48*** | (2006.01) |
| ***H01Q 5/392*** | (2015.01) |
| ***H01Q 9/30*** | (2006.01) |
| ***H01Q 9/38*** | (2006.01) |
| ***H01Q 11/08*** | (2006.01) |
| ***H01Q 21/24*** | (2006.01) |
| ***H04W 72/0446*** | (2023.01) |

(52) U.S. Cl.
CPC ................ *H01Q 9/30* (2013.01); *H01Q 9/38* (2013.01); *H01Q 11/08* (2013.01); *H01Q 21/24* (2013.01); *H04W 72/0446* (2013.01)

(58) Field of Classification Search
CPC ........... H01Q 9/42; H01Q 1/48; H01Q 21/30; H01Q 5/371; H01Q 5/392; H01Q 9/30
See application file for complete search history.

(56) References Cited

U.S. PATENT DOCUMENTS

| | | | | |
|---|---|---|---|---|
| 5,300,936 | A | 4/1994 | Izadian | |
| 5,923,301 | A | 7/1999 | Chen | |
| 5,982,103 | A | 11/1999 | Mosebrook et al. | |
| 6,085,076 | A | 7/2000 | Lindsay et al. | |
| 6,983,783 | B2 | 1/2006 | Carmen, Jr. et al. | |
| 7,088,302 | B2 * | 8/2006 | Louzir | H01Q 13/106 343/769 |
| 7,362,285 | B2 | 4/2008 | Webb et al. | |
| 7,573,208 | B2 | 8/2009 | Newman, Jr. | |
| 8,009,042 | B2 | 8/2011 | Steiner et al. | |
| 8,199,010 | B2 | 6/2012 | Sloan et al. | |
| 8,228,184 | B2 | 7/2012 | Blakeley et al. | |
| 8,330,638 | B2 | 12/2012 | Altonen et al. | |
| 8,988,298 | B1 | 3/2015 | Akhoondzadehasl et al. | |
| 9,219,302 | B2 | 12/2015 | Jenwatanavet | |
| 9,337,943 | B2 | 5/2016 | Mosebrook et al. | |
| 10,153,561 | B2 | 12/2018 | Boyer | |
| 11,710,903 | B2 * | 7/2023 | Pajona | H01Q 1/52 343/852 |
| 2004/0140940 | A1 | 7/2004 | Vothknecht et al. | |
| 2007/0082632 | A1 | 4/2007 | Du | |
| 2008/0001823 | A1 * | 1/2008 | Jung | H01Q 9/40 343/702 |
| 2008/0079645 | A1 | 4/2008 | Higasa et al. | |
| 2009/0195065 | A1 | 8/2009 | Rofougaran | |
| 2009/0206983 | A1 | 8/2009 | Knode et al. | |
| 2009/0213029 | A1 | 8/2009 | Ballarda et al. | |
| 2009/0315790 | A1 | 12/2009 | Merlin | |
| 2010/0244706 | A1 | 9/2010 | Steiner et al. | |
| 2010/0244709 | A1 | 9/2010 | Steiner et al. | |
| 2012/0056712 | A1 | 3/2012 | Knode | |
| 2012/0261078 | A1 | 10/2012 | Adams et al. | |
| 2014/0001846 | A1 | 1/2014 | Mosebrook et al. | |
| 2015/0123868 | A1 * | 5/2015 | Bit-Babik | H01Q 9/0464 29/600 |
| 2015/0362668 | A1 | 12/2015 | McDonald et al. | |
| 2015/0371534 | A1 | 12/2015 | Dimberg et al. | |
| 2016/0365622 | A1 * | 12/2016 | Na | H01Q 5/35 |
| 2017/0133764 | A1 | 5/2017 | Tinaphong et al. | |
| 2017/0170555 | A1 | 6/2017 | Van Gils et al. | |
| 2017/0179585 | A1 | 6/2017 | Kaufmann et al. | |

OTHER PUBLICATIONS

Silicon Labs, "Using Antenna Diversity to Create Highly Robust Radio Links", 2009, 13 pages.
Awang, "Polarization Diversity Monopole Antenna", PIERS Proceedings, Cambridge, USA,5 pages Jul. 5-8, 2010, 5 pages.

* cited by examiner

DUAL ANTENNA WIRELESS COMMUNICATION DEVICE IN A LOAD CONTROL SYSTEM

CROSS REFERENCE TO RELATED APPLICATION

This application is a continuation of U.S. patent application Ser. No. 17/316,096, filed May 10, 2021; which is a divisional of U.S. patent application Ser. No. 15/337,550 filed Oct. 28, 2016, now U.S. Pat. No. 11,005,159 issued May 11, 2021; each of which claims the benefit of Provisional U.S. Patent Application No. 62/248,762, filed Oct. 30, 2015, the disclosures of which are incorporated herein by reference in their entirety.

BACKGROUND

Buildings, such as homes, office buildings, warehouses, factories, and the like, often use load control systems for controlling electrical loads. Examples of electrical loads include electric lights, motorized window treatments, fans, and other energy-consuming devices. A load control system may include one or more load control devices such as a wall-mounted dimmer switch, a temperature controller, a motorized window treatment, and the like. The load control devices may operate completely independently of each other and at same time be subject to system-wide controls. For example, a central command unit of the load control system may initiate a whole-room timeclock function to set all of the electrical loads in one mode during the day and another mode afterhours. Accordingly, it may be desirable that the load control system include a wireless communication device for transmitting digital messages (e.g., system-wide control messages) to and receiving digital messages (e.g., response or status messages) from the one or more individual load control devices.

It may be further desirable that multiple antennas be used to increase the reliability of the communication link between a wireless communication device, such as the central command unit, and the individual load control devices in the load control system. For example, antenna systems may use multiple antennas to obtain diversity, such as spatial diversity and polar diversity. To achieve spatial diversity, two antennas of a prior art antenna system are typically spaced apart from each other by a distance of greater than one quarter of the wavelength of the operating frequency. The spacing between the two antennas helps to ensure that there is proper isolation between the antennas so that the antennas act as independent structures and spatial diversity may be obtained. In some cases, the antennas may need to be spaced apart by up to one half of the wavelength of the operating frequency due to other electrical characteristics of the wireless communication device. As the transmission frequency is reduced, for example, below one gigahertz, the transmission wavelength, and in turn the typical spacing required for the antennas increases. The spacing between the antennas can be a limiting factor to the size and form factor of the wireless control device.

A wireless communication device for use in a load control system, such as the central command unit, may have to meet requirements unique to the use environment of the load control system, such as complying with specific dimensional constraints in order to utilize limited installation space and/or having certain aesthetics appeals to satisfy consumer demands. There is a need for a wireless communication device that includes features that conform to the unique set of requirements and at the same time maintain an optimum performance level.

SUMMARY

As described herein, a wireless communication device for use in a load control system for controlling one or more electrical loads may include two polarly-diverse antennas that are spaced apart from each other by less than one quarter of the wavelength of the operation frequency of the wireless communication device, but still achieve isolated antenna performance. The arrangement of the two antennas may bring many benefits including, for example, polarization diversity between the two antennas, a reduced size of the communication device due to the reduced spacing between the antennas (e.g., less than one quarter wavelength apart), among other things.

The wireless communication device may comprise a counterpoise, which may be shared by the two antennas. The two antennas may be oriented differently from each other to achieve polar diversity. For example, a first one of the antennas may have a longitudinal axis that extends perpendicularly from the counterpoise, while a second one of the antennas may extend in a plane substantially parallel to the counterpoise (e.g., may be co-planar with a plane of the counterpoise). Further, the first antenna may extend from the counterpoise at a point substantially central to the counterpoise, while the second antenna may extend along a perimeter of the counterpoise.

The one or more electrical loads of the load control system may each be controlled by a load control device that forms a part of the load control system. The wireless communication device may enable the load control system to communicate with the load control devices by transmitting radio-frequency (RF) messages to and receiving RF messages from the load control devices via an RF communication circuit and the antennas.

The RF communication circuit may be coupled to the two antennas to enable wireless communication at a certain frequency (e.g., 434 MHz and/or 868 MHz). The control circuit may control the manner of the wireless communication. For example, the control circuit may cause the RF communication circuit to transmit a first wireless signal in a first time slot and a second wireless signal in a second time slot.

The wireless communication device may further comprise a printed circuit board, which may comprise the counterpoise. The counterpoise may define a substantially circular area, and the second antenna may extend in a substantially circular manner in an area outside the area of the counterpoise. Either or both of the RF communication circuit and the control circuit may be mounted on the printed circuit board. Additionally, the wireless communication device may comprise one or more visual indicators (e.g., light-emitting diodes), light pipes, and/or light reflection components for illuminating at least the first antenna.

DETAILED DESCRIPTION

Figure 1:
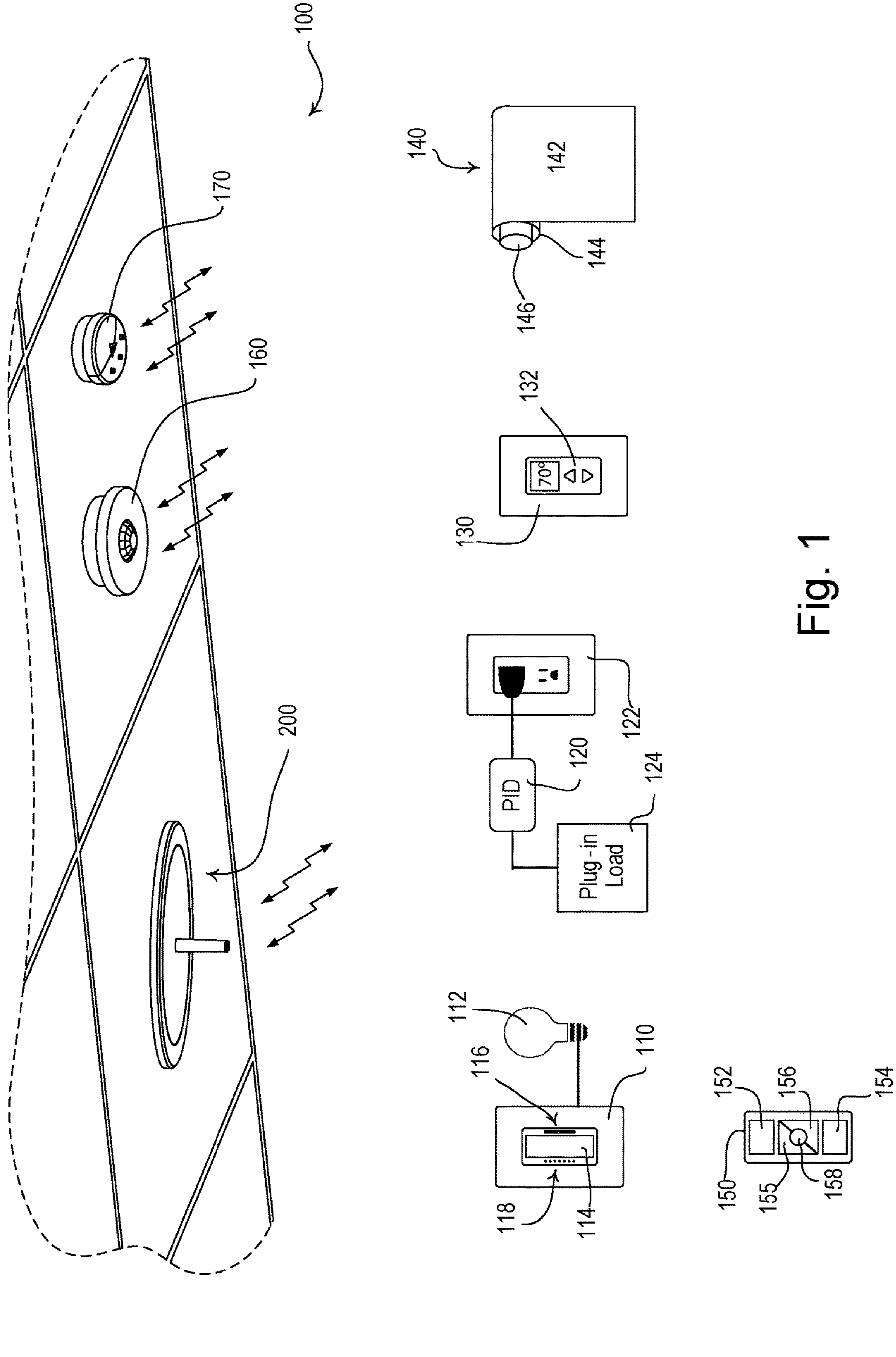
FIG. 1 is a diagram of an example load control system.

FIG. 1 shows an example load control system 100. The load control system 100 may include, for example, a dimmer switch 110, a plug-in load control device (PID) 120, a temperature control device 130, a motorized window treatment 140, a remote controls 150, an occupancy sensor 160, and a daylight sensor 170. The dimmer switch 110 may be coupled in series electrical connection between an alternating-current (AC) power source (not shown) and a lighting load 112 for controlling the amount of power delivered to the lighting load. The dimmer switch 110 may be adapted to be wall-mounted in a standard electrical wallbox, or may alternatively be implemented as a table-top load control device. The dimmer switch 110 may comprise a toggle actuator 114 and/or an intensity adjustment actuator 116. Actuations of the toggle actuator 114 may toggle, i.e., turn off and on, the lighting load 112, while actuations of upper and lower portions of the intensity adjustment actuator 116 may respectively increase or decrease a present lighting intensity of the lighting load between a minimum intensity (e.g., approximately 1%) and a maximum intensity (e.g., approximately 100%). The dimmer switch 110 may also comprise a plurality of visual indicators 118, e.g., light-emitting diodes (LEDs), which may be arranged in a linear array on the dimmer switch and may be illuminated to provide feedback of the intensity of the lighting load. An example of a dimmer switch is described in greater detail in U.S. Pat. No. 5,248,919, issued Sep. 29, 1993, entitled LIGHTING CONTROL DEVICE, the entire disclosure of which is hereby incorporated by reference.

The plug-in load control device 120 may be configured to be plugged into a standard electrical receptacle 122 for receiving power from the AC power source. The plug-in load control device 120 may control the power delivered to a plug-in electrical load 124 (such as, for example, a table lamp or other lighting load, or a television or other appliance), which may be plugged into the plug-in load control device 120. For example, the plug-in load control device 120 may be operable to switch the plug-in load 124 on and off and/or to control the amount of powered delivered to the plug-in electrical load 124 so as to adjust the lighting intensity of a table lamp plugged into the plug-in load control device 120.

The temperature control device 130 may be operable to control a heating, ventilation, and/or air-conditioning (HVAC) control system (not shown) for adjusting a present temperature of the room in which the load control system 100 is installed. The temperature control device 130 may be operable to determine the present temperature in the room and to control the HVAC system to adjust the present temperature towards a setpoint temperature. For example, a temperature sensor (not shown) may be operable to measure the present temperature in the room and transmit the present temperature to the temperature control device 130. The temperature control device 130 may comprise a user interface 132 having a temperature adjustment actuator for adjusting the setpoint temperature and a visual display for displaying the present temperature.

The motorized window treatment 140 (e.g., a roller shade) may be positioned in front of a window for controlling the amount of daylight entering the room. The motorized window treatment 140 may comprise a flexible shade fabric 142 rotatably supported by a roller tube 144. Each motorized window treatment 140 may be controlled by an electronic drive unit (EDU) 146, which may be located inside the roller tube 144. The electronic drive unit 146 may be operable to rotate the respective roller tube 144 to move the bottom edge of the shade fabric 142 to, for example, a fully-open position or a fully-closed position, or to any position between the fully-open position and the fully-closed position (e.g., a preset position). Further, the motorized window treatments 140 may comprise other types of daylight control devices, such as, for example, motorized draperies, roman shades, pleated shades, or blinds, tensioned roller shade systems for non-vertical windows (e.g., skylights), controllable window glazings (e.g., electrochromic windows), controllable exterior shades, or controllable shutters or louvers. Examples of motorized window treatments are described in commonly-assigned U.S. Pat. No. 6,983,783, issued Jan. 10, 2006, entitled MOTORIZED SHADE CONTROL SYSTEM, and U.S. Patent Application Publication No. 2012/0261078, published Oct. 18, 2012, entitled MOTORIZED WINDOW TREATMENT, the entire disclosures of which are hereby incorporated by reference.

The load control devices (e.g., such as the dimmer 110, plug-in load control device 120, temperature control device 130, and motorized window treatment 140) may be operable to control their respective electrical loads in response to signals received from one or more remote controls 150. For example, the load control devices may comprise a wireless communication module for transmitting and/or receiving RF signals. The wireless communication module may comprise a RF transceiver and an antenna. Examples of antennas for wall-mounted dimmer switches are described in greater detail in U.S. Pat. No. 5,982,103, issued Nov. 9, 1999, and U.S. Pat. No. 7,362,285, issued Apr. 22, 2008, both entitled COMPACT RADIO FREQUENCY TRANSMITTING AND RECEIVING ANTENNA AND CONTROL DEVICE EMPLOYING SAME, the entire disclosures of which are hereby incorporated by reference. The remote control 150 may be battery-powered and operable to transmit RF signals for controlling the various electrical loads in response to user actuations of a plurality of buttons of the remote control (e.g., to provide manual override). The remote control 150 may comprise an on button 152, an off button 154, a raise button 155, a lower button 156, and/or a preset button 158. The remote control 150 may transmit, for example, digital messages including a serial number of the remote control (e.g., a unique identifier) as well as information regarding which of the buttons was actuated to the various load control devices via the RF signals. For example, the dimmer switch 110 may turn the lighting load 112 on and off in response to actuations of the on button 152 and the off button 154 of the remote control 150, respectively. The dimmer switch 110 may raise and lower the intensity of the lighting load 112 in response to actuations of the raise button 155 and the lower button 156, respectively. The dimmer switch 110 may control the intensity of the lighting load 112 to a preset intensity in response to actuations of the preset button 158. Examples of battery-powered remote controls are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Pat. No. 7,573,208, issued Aug. 22, 2009, entitled METHOD OF PROGRAMMING A LIGHTING PRESET FROM A RADIO-FREQUENCY REMOTE CONTROL, the entire disclosures of which are hereby incorporated by reference.

One or more of the load control devices (e.g., such as the dimmer 110, the plug-in load control device 120, the temperature control device 130, and the motorized window treatment 140) may be operable to control their respective electrical loads in response to signals received from the occupancy sensor 160. The occupancy sensor 160 may be mounted (e.g., on a ceiling) so as to cover a sufficiently large area for determining the occupancy status of the room. The occupancy sensor 160 may be operable to transmit RF signals to the load control devices for controlling the various electrical loads in response to detecting the presence or absence of an occupant in the room in which the occupancy sensor 160 is located. The occupancy sensor 160 may include an internal detector (e.g., a pyroelectric infrared (PIR) detector), which is operable to receive infrared energy from an occupant in the space to thus sense the occupancy condition in the space. The occupancy sensor 160 may be operable to process the output of the PIR detector to determine whether an occupancy condition (e.g., the presence of the occupant) or a vacancy condition (e.g., the absence of the occupant) is presently occurring in the space, for example, by comparing the output of the PIR detector to a predetermined occupancy voltage threshold. Alternatively, the internal detector could comprise an ultrasonic detector, a microwave detector, or any combination of PIR detectors, ultrasonic detectors, and microwave detectors. The occupancy sensor 160 may operate in an "occupied" state or a "vacant" state in response to the detections of occupancy or vacancy conditions, respectively, in the space. If, for example, the occupancy sensor 160 is in the vacant state and the occupancy sensor 160 determines that the space is occupied in response to the PIR detector, the occupancy sensor 160 may change to the occupied state. The load control devices may be responsive to the RF signals transmitted by the occupancy sensor 160 as a result of the change of state, and may adjust the operational settings of the various electrical loads accordingly. Examples of RF load control systems having occupancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,228,184, issued Jul. 24, 2012, entitled BATTERY-POWERED OCCUPANCY SENSOR; and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

One or more of the load control devices (e.g., such as the dimmer 110, the plug-in load control device 120, the temperature control device 130, and the motorized window treatment 140) may be operable to control their respective electrical loads in response to signals received from the daylight sensor 170. The daylight sensor 170 may be mounted (e.g., on a ceiling) so as to measure a total light intensity in the space around the daylight sensor. The daylight sensor 170 may be responsive to a total light intensity measured by an internal photosensitive circuit (e.g., a photosensitive diode). The daylight sensor 170 may be operable to wirelessly transmit digital messages including a value representative of the total lighting intensity to the load control devices of the load control system 100 via RF signals. Examples of load control systems having daylight sensors are described in greater detail in commonly-assigned U.S. Patent Application Publication No. 2010/0244709, published Sep. 30, 2010, entitled WIRELESS BATTERY-POWERED DAYLIGHT SENSOR, and U.S. Patent Application Publication No. 2010/0244706, published Sep. 30, 2010, entitled METHOD OF CALIBRATING A DAYLIGHT SENSOR, the entire disclosures of which are hereby incorporated by reference.

The load control system 100 may further comprise a wireless control device 200 operable to transmit digital messages (e.g., from a central command unit of the load control system 100) to one or more of the load control devices (e.g., the dimmer 110, the plug-in load control device 120, the temperature control device 130, the motorized window treatment 140, and/or the remote control 150) in the load control system 100. The wireless communication device 200 may be operable to receive digital messages from the one or more of the load control devices. For example, the wireless communication device 200 may be configured to transmit RF messages to the load control devices querying their operational status. The wireless communication device 200 may also be configured to receive RF messages from the load control devices reporting their operational status. Furthermore, the wireless communication device 200 may be configured to send command messages (e.g., individualized command messages and/or system-wide command messages) to the load control devices controlling their respective electrical loads, for example. As described herein, the load control devices may each comprise a wireless communication module to facilitate the communication between the load control device and the wireless communication device 200. For example, the wireless communication module may include a RF transceiver and an antenna for transmitting and/or receiving RF signals.

In addition to or in lieu of communicating with one or more load control devices in the load control system 100, the wireless communication device 200 may also be operable to communicate with systems or devices outside the load control system 100. For example, the wireless communication device 200 may be configured to receive operating mode commands from a building or energy management system that manages one or more of the load control systems 100, and relay those commands to load control devices in each load control system 100. The wireless communication device 200 may be configured to collect data (e.g., status information) from load control devices of each load control system 100 and transmit the data to the building or energy management system for aggregation and/or analysis, for example. The wireless communication device 200 may be connected to these outside systems or devices over a network such as a local area network or the Internet via a network communication link. In one or more examples, the network communication link may comprise, for example, a digital communication link operating in accordance with a predefined communication protocol (such as, for example, one of Ethernet, IP, WiFi, QS, DMX, BACnet, Modbus, LonWorks, and KNX protocols). In one or more examples, the network communication link may comprise a serial digital communication link, an RS-485 communication link, an RS-232 communication link, a digital addressable lighting interface (DALI) communication link, or a LUTRON ECOSYSTEM communication link.

The wireless communication device 200 may be operable to communicate (e.g., transmit and receive digital messages via the RF signals) using a time division technique (e.g., the wireless communication device 200 may transmit digital messages during predetermined time slots). An example of wireless communication in a load control system using the time division technique is described in greater detail in commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference. Communication may be either one-way or two-way. An example of a load control system having both one-way and two-way communication devices is described in greater detail in commonly-assigned U.S. Patent Application Publication No. 2012/0056712, published Mar. 8, 2012, entitled METHOD OF CONFIGURING A TWO-WAY WIRELESS LOAD CONTROL SYSTEM HAVING ONE-WAY WIRELESS REMOTE CONTROL DEVICES, the entire disclosure of which is hereby incorporated by reference.

The wireless communication device 200 may be installed in the room in which one or more of load control devices (e.g., the dimmer 110, the plug-in load control device 120, the temperature control device 130, the motorized window treatment 140, and/or the remote control 150) are installed. Alternatively, the wireless communication device 200 may also be located in a different room or location from where the one or more load control devices are installed. For example, the wireless communication device 200 may be installed in a hallway outside of the room in which the load control devices are installed. The specific location for installing the wireless communication device 200 may also vary. For example, the wireless communication device 200 may be mounted on a ceiling (e.g., as shown in FIG. 1), or on a wall.

Figure 2:
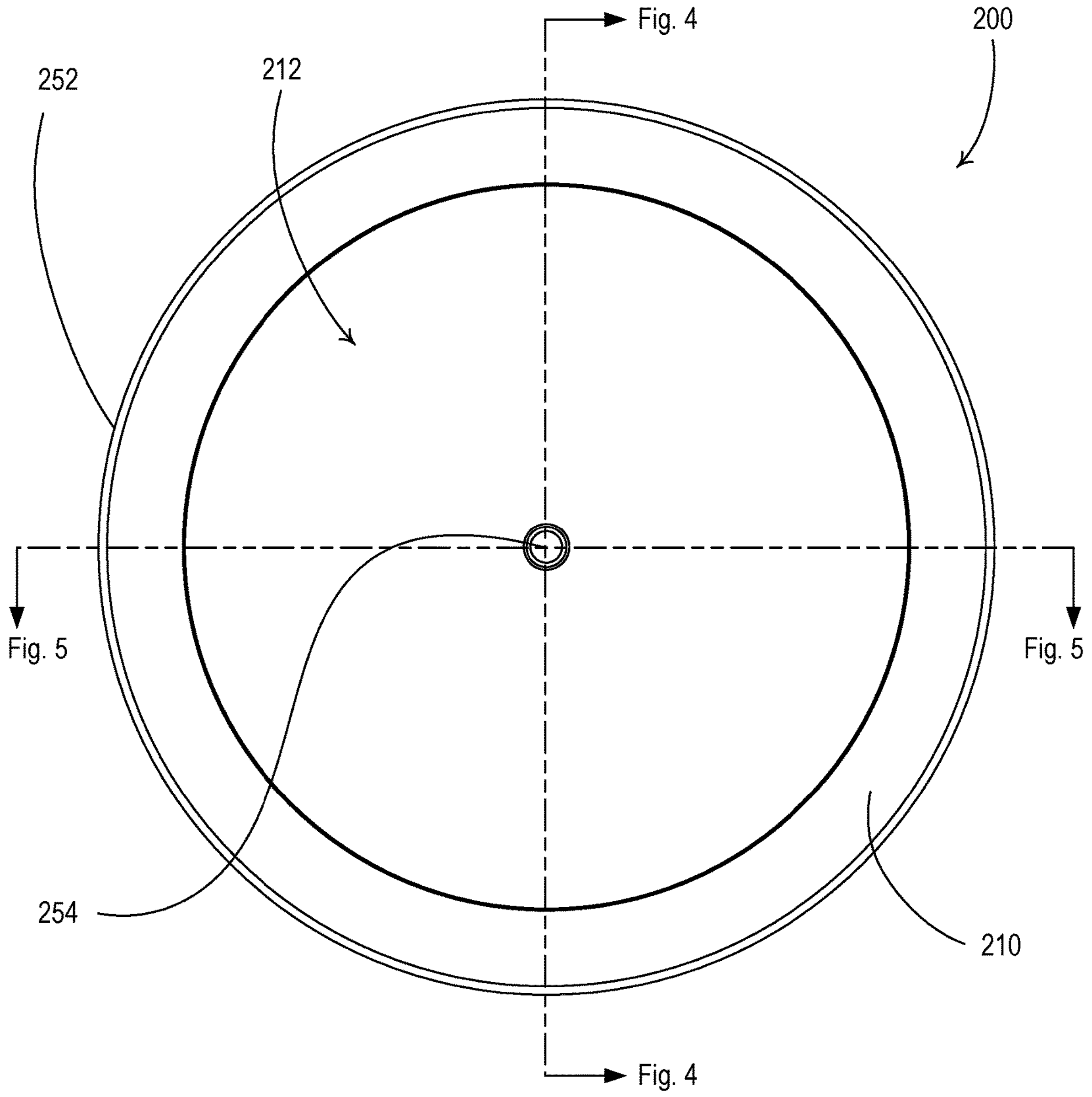
FIG. 2 is a bottom view of an example wireless communication device.
Figure 3:
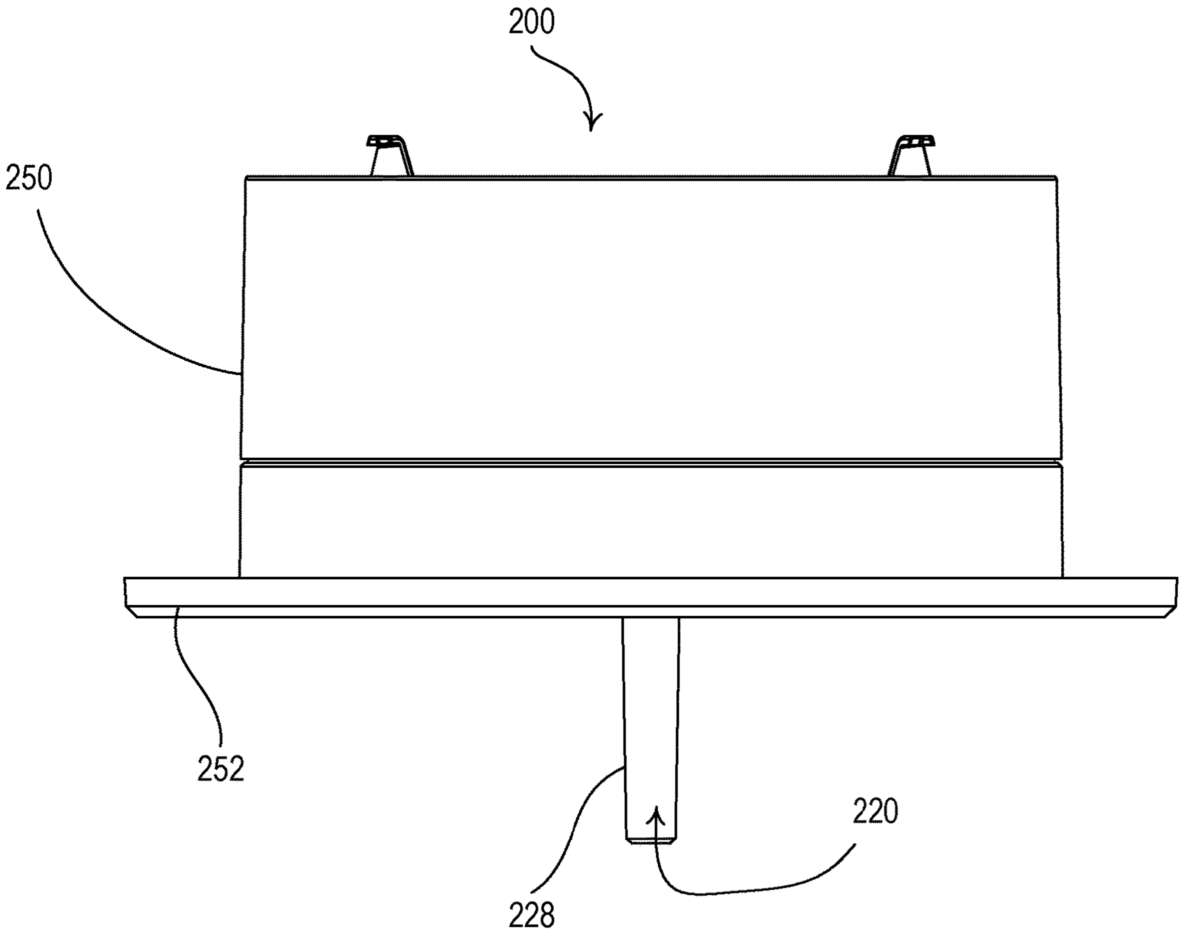
FIG. 3 is a side view of an example wireless communication device showing an enclosure.
Figure 4:
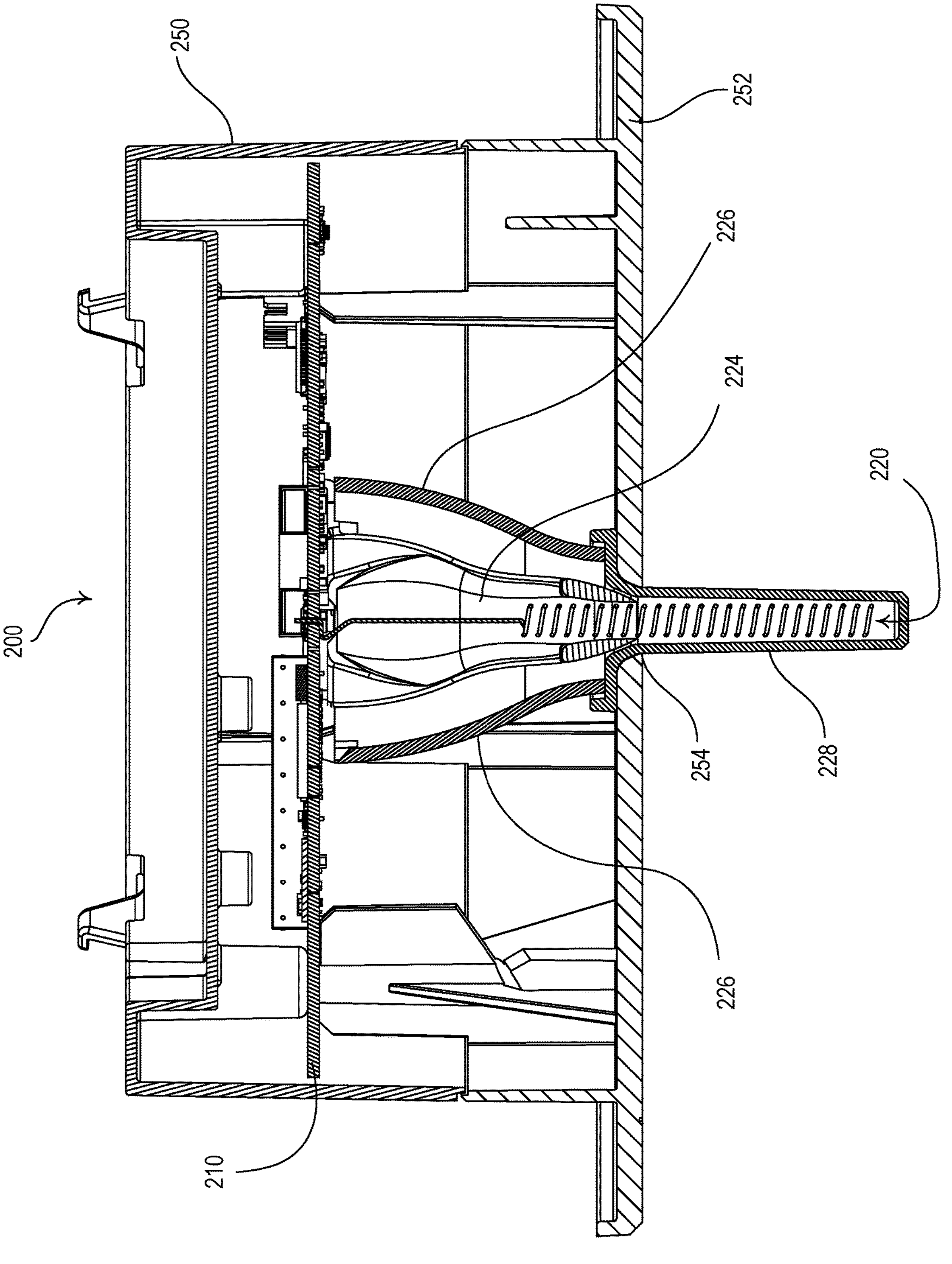
FIG. 4 is a first cross-sectional view of an example wireless communication device.
Figure 5:
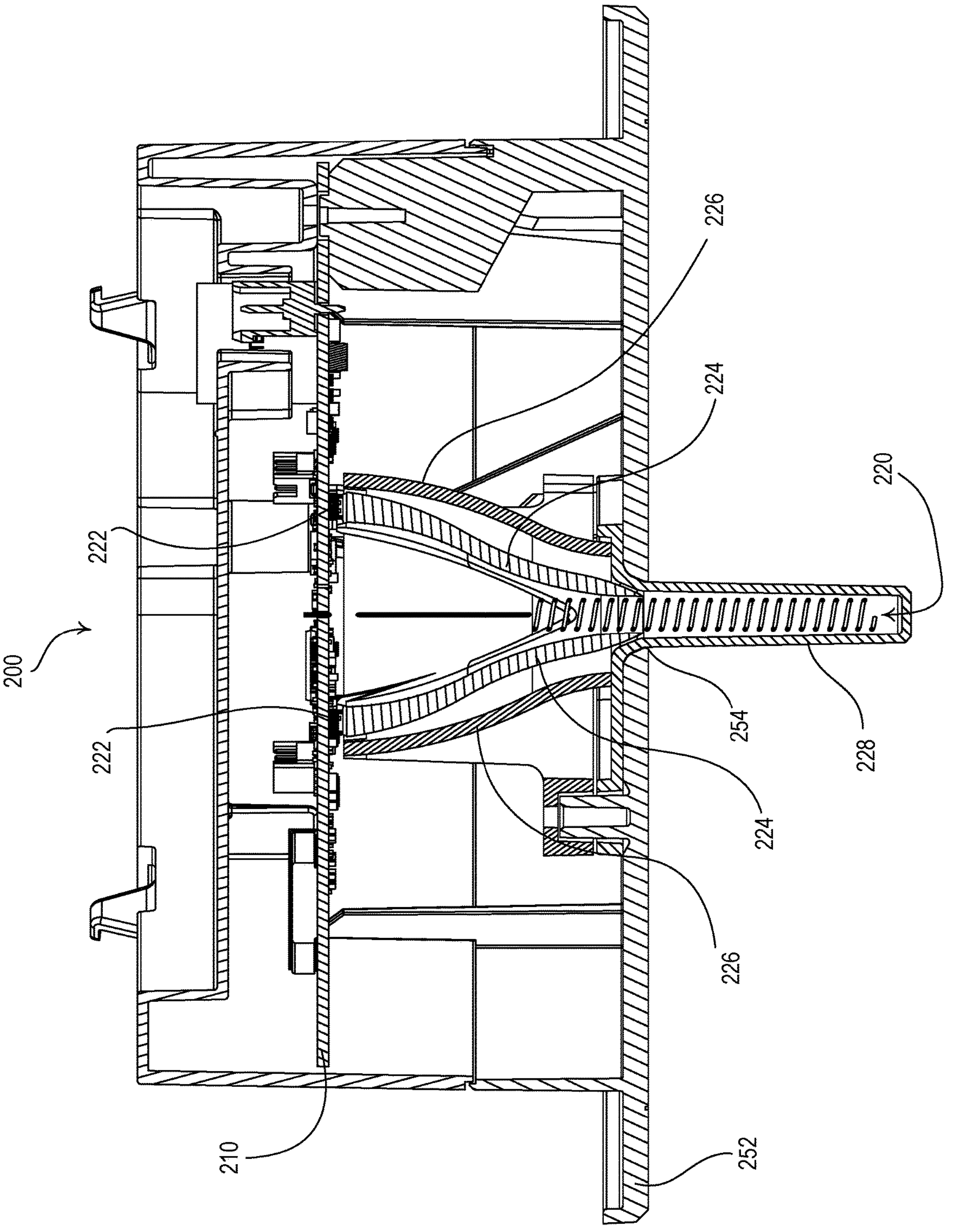
FIG. 5 is a second cross-sectional view of an example wireless communication device.
Figure 6:
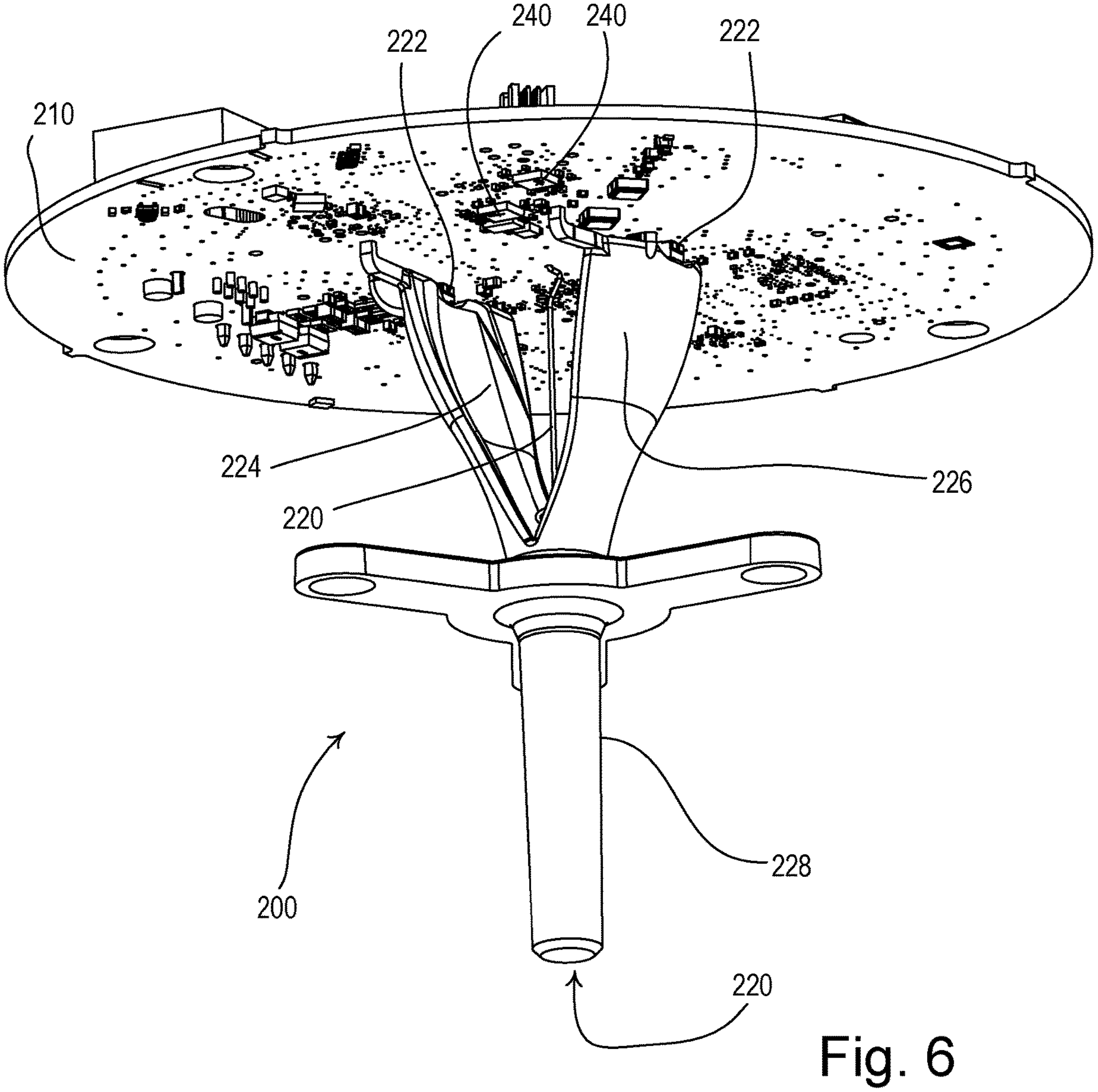
FIG. 6 is a front perspective view of an example wireless communication device without an enclosure.

FIG. 2 is a bottom view of the wireless communication device 200. FIG. 3 is a side view of the wireless communication device 200 showing an enclosure 250. FIGS. 4 and 5 are first and second cross-sectional views of the wireless communication device 200. FIG. 6 is a front perspective view of the wireless communication device without the enclosure 250.

The wireless communication device 200 may comprise a printed circuit board (PCB) 210, a first antenna 220, a second antenna 230, a RF communication circuit (e.g., one or more RF transceivers 240), a control circuit 260 (e.g., such as that shown in FIG. 8), and an enclosure 250. The enclosure 250 may house one or more of the foregoing components. The enclosure 250 may be mounted to various locations, including, for example, a ceiling or a wall. In one or more examples, an opening may be made in a ceiling through which the enclosure 250 may be inserted and fixed to the ceiling. In other examples, an opening may be made in a wall through which the enclosure 250 may be inserted and attached to a structure behind the wall. The enclosure 250 may include a cover 252, which may be attached (e.g., snapped) to the body of the enclosure 250 to cover the opening in the ceiling or wall, for example, after the enclosure 250 has been mounted. The cover 252 may have different shapes including circle, square, hexagon, and the like. Additionally, the cover 252 may have a central (e.g., substantially central) opening 254 through which the first antenna 220 may extend as described herein.

The wireless communication device 200 may comprise a counterpoise 212, which may be formed on the PCB 210. The first and second antennas 220, 230 may share the counterpoise 212. In other words, the counterpoise 212 may operate as a common RF ground for the first and second antennas 220, 230. The PCB 210 may comprise one or more layers and have different shapes such as circle, square, rectangle, polygon, and the like (e.g., including irregular shapes). The counterpoise 212 may have a similar shape as or different shape from the PCB 210. The counterpoise 212 may comprise one or more layers of conductive materials (e.g., copper), and as such, may define one or more planes. For example, the counterpoise 212 may comprises one or more parallel layers of conductive materials that may be connected together by conductive material plated by means of vias through the layers of the PCB 210. The layers of the counterpoise 212 may vary in size and/or shape. When the PCB 210 comprises multiple layers, the conductive materials of the counterpoise 212 may contact one or more of the layers of the PCB 210 (e.g., at locations within the area of the counterpoise) to provide grounding for various PCB components located on each PCB layer. As such, the counterpoise 212 may act as a ground plane (e.g., or a plurality of parallel ground planes) for the PCB 210.

Figure 7:
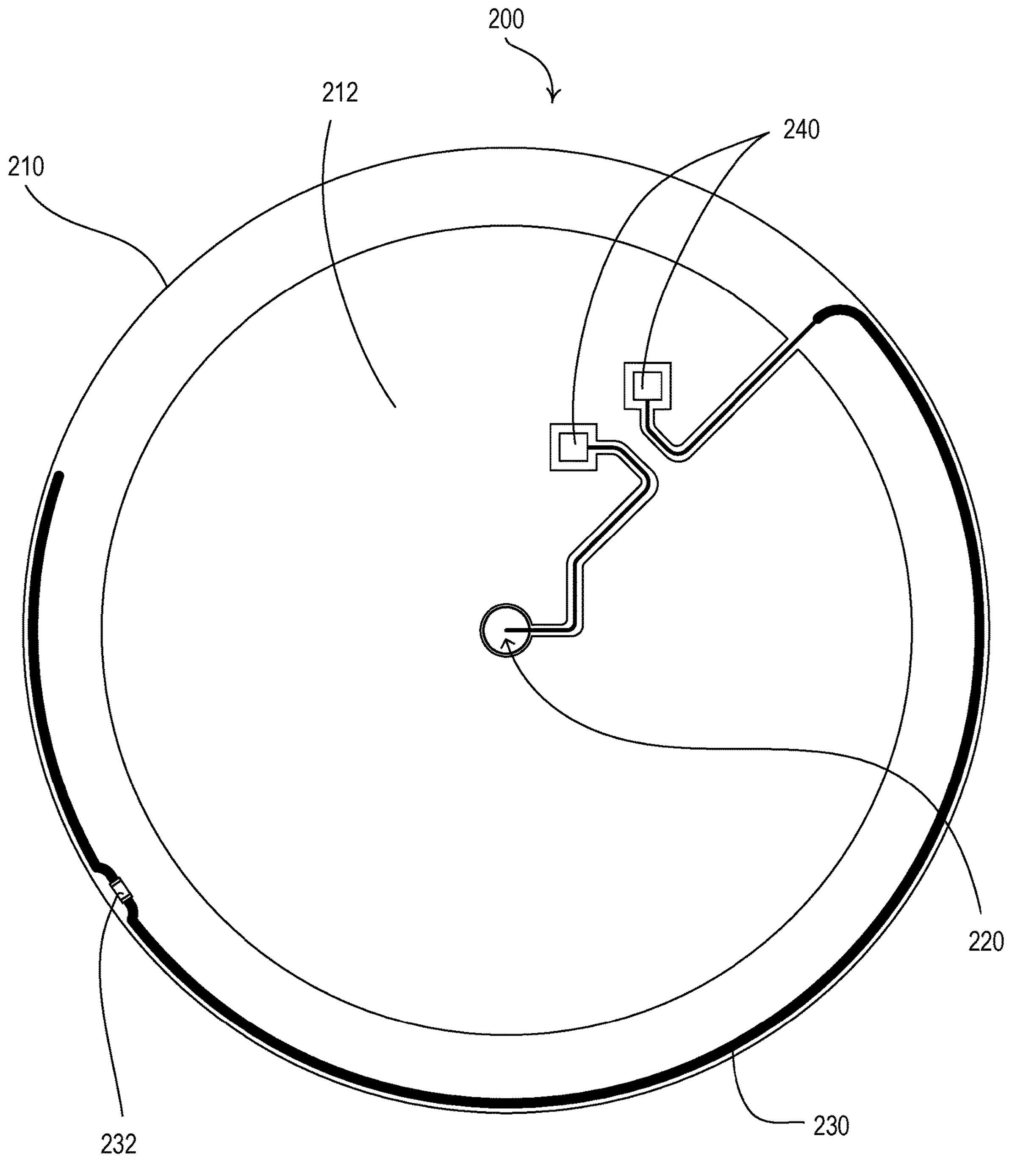
FIG. 7 is a simplified bottom view of an example PCB showing a second antenna and connections between a first and second antennas and RF transceivers.

FIG. 7 is a simplified bottom view of an example PCB (e.g., the PCB 210) showing the second antenna 230 and connections between the first and second antennas 220, 230 and RF transceivers 240. Either or both of the RF communication circuit and control circuit 260 may be mounted on the PCB 210. The RF communication circuit may comprise the one or more RF transceivers 240, which may be implemented as integrated circuits (ICs), or other types of RF transmitters and receivers. The RF communication circuit may be coupled to the first antenna 220 and the second antenna 230. In one or more examples, the first antenna 220 may be coupled to one of the transceivers 240 while the second antenna 220 may be coupled to another of the transceivers 240. In one or more examples, either of the antennas 220, 230 may be coupled to more than one transceivers 240 and may be operable to switch between the multiple transceivers via a switching device, for example. In one or more examples, both of the antennas 220, 230 may be coupled to the same transceiver and may be operable to share the transceiver through a switching device, for example.

The first antenna 220 may have various structures. For example, the first antenna 220 may be a monopole antenna (e.g., such as a helical antenna as shown in FIGS. 4 and 5), or the like. Various dimensions and orientations may be possible for the first antenna 220 depending, for example, on the spatial characteristics of the use environment and/or the transmission frequency utilized by the wireless communication device 200. With reference to dimension, the first antenna 220 may have a length that is approximately one-quarter wavelength or less of the transmission frequency (e.g., approximately 6.8 inches with a transmission frequency of approximately 434 MHz), for example. With reference to orientation, the first antenna 220 may have a longitudinal axis extending from the counterpoise 212 and/or the PCB 210 in a direction that is substantially perpendicular to the counterpoise (e.g., one or more planes of the counterpoise) and/or the PCB 210, for example. In one or more examples, the counterpoise 212 may define a substantially circular area and the first antenna 220 may have a longitudinal axis that extends through the area of the counterpoise 212 (e.g., through the central opening 254 of the cover 252) substantially perpendicularly from the counterpoise 212. With such an example orientation, a portion or the entirety of the first antenna 220 may extend outside the cover 252 (and thus the enclosure 250). The exact length of the first antenna 220 that extends outside the cover 252 may vary based on, for example, the desired aesthetics appeals and/or RF transmission requirements (e.g., desired transmission range, signal strength, etc.). In one or more examples, the wireless communication device 200 may be configured to be mounted on a ceiling, in which configuration the first antenna 220 may be configured to extend perpendicularly from the ceiling.

The wireless communication device 200 may include a light-transmissive cover 228 for the first antenna 220. The wireless communication device 200 may further comprise an illumination assembly for illuminating at least the light-transmissive cover 228 of the first antenna 220. The illumination assembly may be operable to provide feedback to a user regarding the operational state (e.g., starting up, fault conditions) of the first antenna 220. The illumination assembly may include one or more visual indicators 222 (e.g., light-emitting diodes (LEDs)), light pipes 224, and/or reflective components (e.g., reflective shrouds) 226.

The second antenna 230 may be oriented differently than and/or spaced apart from the first antenna 220. Multiple benefits may result from such arrangements including, for example, polarization diversity, among other things. In one or more examples, the second antenna 230 may be orthogonally oriented with respect to the first antenna 220. For instance, the second antenna may be located in a plane that is substantially parallel to the counterpoise 212 (e.g., at least one layer of the counterpoise 212) and/or the PCB 210 while the first antenna 220 may extend perpendicularly from the counterpoise 212 and/or the PCB 210. The plane in which the second antenna 230 resides may be the same plane as a layer of the counterpoise 212 (e.g., co-planar with the layer of the counterpoise) or a different plane from the counterpoise. In one or more examples, the second antenna 230 may be positioned on the PCB 210. Alternatively, the second antenna 230 may not be located on the PCB 210, but may still extend in a plane substantially parallel to the counterpoise 212 and/or the PCB 210. For instance, the second antenna 230 may extend around an inside surface of the enclosure 250 in a plane substantially parallel to the counterpoise 212 and/or PCB 210.

The second antenna 230 may be located on the PCB 210 in an area outside the area of the counterpoise 212 (e.g., as shown in FIG. 7). For instance, the counterpoise 212 and/or the PCB 210 may comprise a substantially circular perimeter (e.g., defining a substantially circular area) and the second antenna 230 may be located along the perimeter(s) of the counterpoise 212 (e.g., and/or the PCB 210) also in a substantial circular manner and outside the area of the counterpoise 212. The contour of the second antenna 230 may be substantially similar to the contour (e.g., the periphery) of the counterpoise 212 (e.g., and/or the PCB 210). Alternatively, the second antenna 230 may have a contour that is different than the contour of the counterpoise 212 (e.g., and/or the PCB 210). For instance, the counterpoise 212 and/or PCB 210 may comprise a substantially circular perimeter and the second antenna 230 may extend along the perimeter(s) of the counterpoise 212 (e.g., and/or the PCB 210) in a non-circular manner (e.g., forming an open or closed polygon, or even zigzagging about the perimeter(s) of the counterpoise 212 (e.g., and/or PCB 210)), or vice versa.

The second antenna 230 may extend along a portion or the entirety of the perimeter(s) of the counterpoise 212 (and/or PCB 210). The exact length of the second antenna 230 may be adjustable based on factors such as the desired impedance, transmission frequency, bandwidth, directivity, efficiency, gain radiation pattern, polarization between the two antennas 220, 230, and/or RF isolation between the two antennas 220, 230. For example, the second antenna 230 may comprise two or more sections (e.g., as shown in FIG. 7), and the wireless communication device may comprise one or more jumpers 232 for changing the transmission frequency (e.g., from 434 MHz to 868 MHz or vice versa) of the antennas 220, 230. For example, the transmission frequency may be changed by removing the jumper 232 to disconnect the sections of the second antenna 230 and replacing the first antenna 220 with a shorter monopole antenna (e.g., thus varying the lengths of the first and second antennas 220, 230). In addition, the first and second antennas 220, 230 may be characterized by dual resonance and may be configured to operate at two different transmission frequencies (e.g., 434 MHz and 868 MHz). Further, the first and second antennas 220, 230 may be configured to operate at other transmission frequencies, such as, for example, 2.4 GHz.

The second antenna 230 may be spaced apart from the first antenna 220. As described in one or more examples herein, the first antenna 220 may extend from the counterpoise 212 and/or PCB 210 at a point substantially central to the counterpoise 212 and/or PCB 210 (e.g., through the central opening 254 of the cover 252). The second antenna may be positioned along the perimeter(s) of the counterpoise 212 (e.g., and/or the PCB 210) in manners described herein. Accordingly, the two antennas may be spaced apart from each other by a distance, the value of which may depend on, for example, the dimensions of the counterpoise 212 and/or PCB 210 and/or the transmission frequency of the wireless communication device 200. For example, the counterpoise 212 and/or PCB 210 may be dimensioned such that the two antennas 220, 230 may be spaced apart by less than a quarter of the wavelength of the antennas' transmission frequency (e.g., less than approximately 6.8 inches with a transmission frequency of approximately 434 MHz) while maintaining an appropriate amount of RF isolation between the two antennas 220, 230 (e.g., greater than approximately 15 dB of isolation, for example, greater than approximately 24 dB of isolation).

Figure 8:
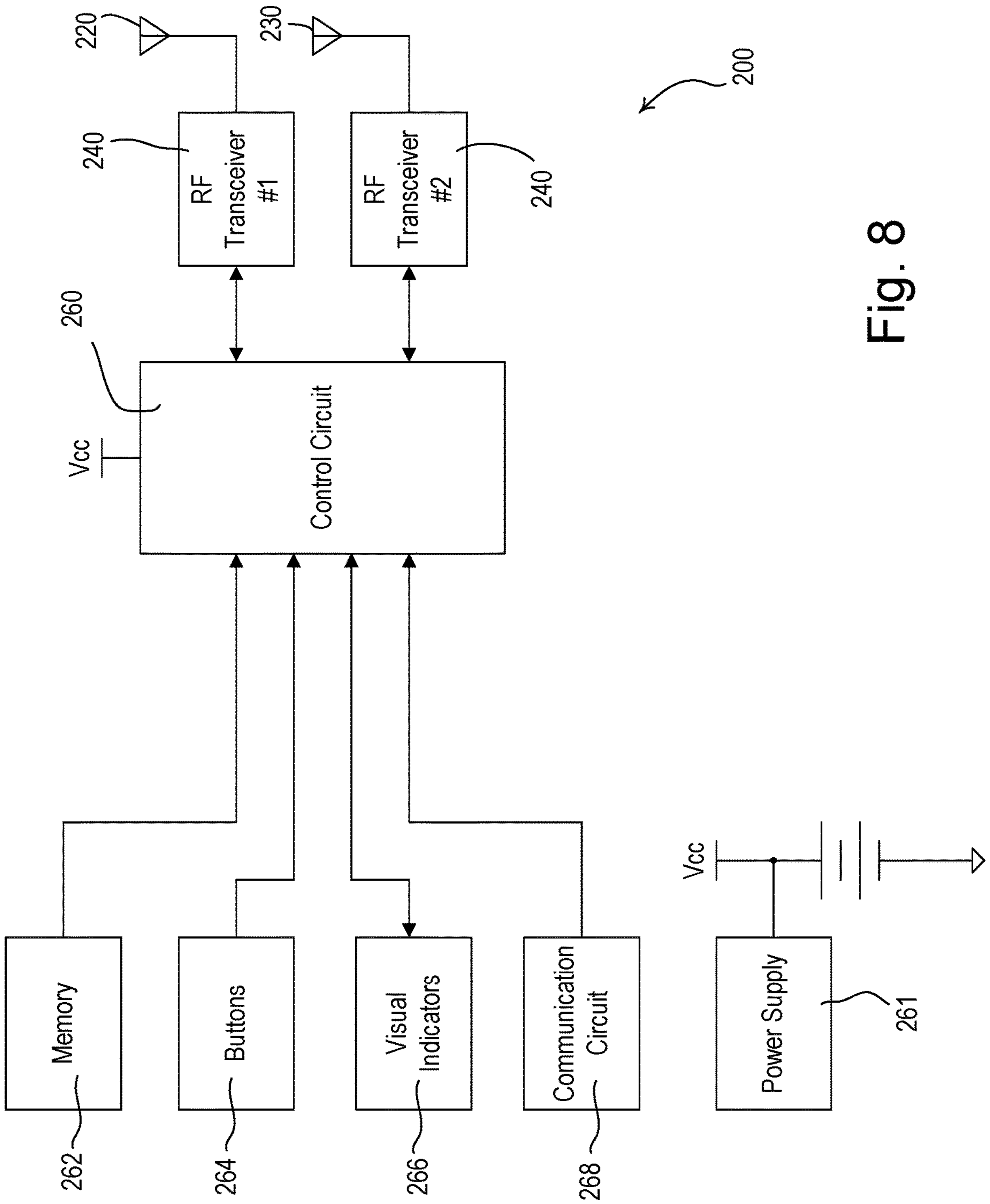
FIG. 8 is a simplified block diagram of an example wireless communication device.

FIG. 8 is a simplified block diagram of the wireless communication device 200 according to one or more examples described herein. The RF communication circuit (e.g., the RF transceivers 240) may transmit a first wireless signal via the first antenna 220 at a first transmission frequency and a second wireless signal via the second antenna 230 at a second transmission frequency. The first and second transmission frequencies may be the same as or different from each other. For example, both the first antenna 220 and the second antenna 230 may transmit at approximately 434 MHz or at approximately 868 MHz. Alternatively, one of the antennas (e.g., the first antenna 220) may transmit at approximately 434 MHz while the other of the antennas (e.g., the second antenna 230) may transmit at approximately 868 MHz, or vice versa. Moreover, the first transmission frequency and/or the second transmission frequency may be less than 1 GHz. The wireless communication device 200 may employ one or more algorithms to use the two antennas 220, 230 for multi-input multi-output (MIMO) techniques, e.g., spatial multiplexing, transmit diversity, and/or the like.

The control circuit 260 may be coupled to the RF communication circuit and operable to cause the RF communication circuit to transmit messages in predetermined time slots according to, for example, one or more time division techniques described herein. For example, the control circuit 260 may be operable to transmit messages on the two antennas 220, 230 in two different respective time slots. In one or more examples, the control circuit 260 may cause a first RF signal to be transmitted via the first antenna 220 in a first time slot, and cause a second RF signal to be transmitted via the second antenna 230 in a second time slot.

The first and second RF signals may comprise the same digital message (e.g., the same command, query, data, etc.). The first and second time slots may not be overlapping and the first time slot may occur immediately before the second time slot. In one or more examples, the control circuit 260 may cause the first and second RF signals to be transmitted in randomly-selected time slots, e.g., selected from a number of non-overlapping time slots. In one or more examples, the load control system 100 may comprise more than one wireless communication device (e.g., such as the wireless communication device 200) and the additional wireless communication devices may be operable to transmit in additional time slots (e.g., different than the first and second time slots).

The control circuit 260 may be operable to cause the RF communication circuit to receive, in a single time slot, an RF signal transmitted by one of the load control devices (e.g., the dimmer 110, the plug-in load control device 120, the temperature control device 130, the motorized window treatment 140, and/or the remote control 150, among others) via both of the first and second antennas 220, 230 at the same time. The control circuit 260 may cause the wireless communication device 200 to respond to the RF signals received by the first antenna 220 (e.g., a first received signal) and by the second antennas 230 (e.g., a second received signal) by, for example, decoding both the first and second received signals and to respond to the signal that is first decoded. The control circuit 260 may be operable to determine which of the first and second received signals has a greater signal strength and to respond to the signal having the greater signal strength. In addition, the control circuit 260 may be operable to combine the first and second received signals and to respond to the combined signal.

In one or more examples, the control circuit 260 may employ one or more algorithms to permit the allocation of one or more transmission slots per each respective antenna of the two antennas 220, 230. For example, the control circuit 260 may assign a first RF transceiver one or more transmission slots of one of the two antennas 220, 230 and may assign to the first RF transceiver the same transmission slots, or one or more different transmission slots of a second of the two antennas 220, 230. The control circuit 260 may assign a second RF transceiver one or more transmission slots of one or both of the two antennas 220, 230 that may be different from the transmission slots assigned to the first RF transceiver. The two antennas 220, 230 may be used to receive signals from the one or more load control devices (e.g., the dimmer 110, the plug-in load control device 120, the temperature control device 130, the motorized window treatment 140, and/or the remote control 150, among others) with which the wireless communication device 200 may communicate. For example, an algorithm employed by the control circuit 260 may evaluate a checksum or other quality control measurement respectively associated with the two antennas 220, 230 to determine which signals (or packets, etc.) received via the two antennas 220, 230 may be more reliable and/or may satisfy a predetermined quality threshold.

Even though FIG. 8 shows two RF transceivers 240 coupled to the two antennas 220, 230 respectively, it is within the scope of this disclosure that one RF transceiver may be used for both antennas 220, 230 through an RF switch. The control circuit 260 may be able to control the position of the RF switch and which of the two antennas 220, 230 is coupled to the RF transceiver and is thus transmitting RF signals. The control circuit 260 may be operable to control the RF switch to a first position to couple the RF transceiver to the first antenna 220 to transmit a first wireless signal in a first time slot, and to control the RF switch to a second position to couple the RF transceiver to the second antenna 230 to transmit a second wireless signal in a second time slot, which may occur immediately after the first time slot. When the wireless communication device 200 is not transmitting RF signals, the control circuit 260 may lock the RF switch in one position, such that only one of the antennas 220, 230 is able to receive the RF signals.

The control circuit 260 may employ one or more algorithms to control the broadcast transmit power of the one or more RF signals transmitted from the two antennas 220, 230, for example, because there are regulatory limitations on the power of radio transmissions. In one or more examples, the control circuit 260 may use the two antennas 220, 230 to respectively transmit signals at or below the regulated transmit power limitations, thereby effectively increasing the transmission range of the one or more RF transceivers used by the wireless communication device 200.

The control circuit 260 described herein may be powered by a power supply 261, and may comprise a microprocessor and/or other types of integrated circuits. For example, the control circuit 260 may comprise a microprocessor, a microcontroller, a programmable logic device (PLD), an application specific integrated circuit (ASIC), a field-programmable gate array (FPGA), or any suitable processing device or control circuit. The wireless communication device 200 may further comprise a memory 262 for storage of the operating characteristics of the wireless communication device 200, and the control circuit 260 may be operably coupled to the memory 262. The memory 262 may be implemented as an external integrated circuit (IC) or as an internal part of the control circuit 260. Additionally, the control circuit 260 may be operable to receive user inputs from buttons 264 and to illuminate the visual indicators 266 to provide feedback (e.g., by illuminating the light-transmissive cover 228 of the first antenna 220). Further, the control circuit 260 may be operable to be connected to a network communication link via a communication circuit 268 (e.g., an Ethernet communication circuit) and a network connection port, which may all be part of the wireless communication device 200.

What is claimed is:

1. A wireless communication device comprising:

a counterpoise;

a first antenna having a longitudinal axis extending in a direction substantially perpendicular to the counterpoise;

a second antenna extending in a plane that is substantially parallel to the counterpoise, the first and second antennas sharing the counterpoise; and a radio-frequency communication circuit coupled to the first and second antennas for transmitting a first wireless signal via the first antenna at a transmission frequency and a second wireless signal via the second antenna at the transmission frequency;

wherein the first and second antennas are spaced apart by less than a quarter of a wavelength of the transmission frequency.

2. The wireless communication device of claim 1, further comprising:

a control circuit coupled to the radio-frequency communication circuit for causing the radio-frequency communication circuit to transmit the first wireless signal in a first time slot and the second wireless signal in a second time slot.

3. The wireless communication device of claim 1, wherein the second antenna is substantially co-planar with a plane of the counterpoise.

4. The wireless communication device of claim 1, wherein the counterpoise is configured to operate as a ground plane.

5. The wireless communication device of claim 1, wherein the second antenna extends along a perimeter of the counterpoise in an area outside the area of the counterpoise.

6. The wireless communication device of claim 1, further comprising:

a printed circuit board that comprises the counterpoise, wherein the second antenna is located on the printed circuit board and the second antenna extends along at least a portion of a perimeter of the PCB.

7. The wireless communication device of claim 1, wherein the wireless communication device is configured to be mounted on a ceiling and wherein the first antenna is configured to extend perpendicularly from the ceiling.

8. The wireless communication device of claim 1 wherein the first antenna extends from the counterpoise at a point substantially central to the counterpoise.

9. The wireless communication device of claim 1 wherein a length of the first antenna is approximately equal to a quarter of a wavelength of the transmission frequency.

10. The wireless communication device of claim 1 wherein the transmission frequency is less than 1 GHz.

11. A wireless communication device comprising:

a printed circuit board comprising:

a counterpoise;

a first antenna having a longitudinal axis extending in a direction substantially perpendicular to the counterpoise;

a second antenna extending in a plane that is substantially parallel to the counterpoise, the first and second antennas sharing the counterpoise;

a radio-frequency communication circuit coupled to the first and second antennas for transmitting a first wireless signal via the first antenna at a transmission frequency and a second wireless signal via the second antenna at the transmission frequency; and one or more light-emitting diodes (LEDs); and a housing disposed about the printed circuit board, the housing including a light transmissive cover disposed about at least a portion of the first antenna;

wherein the one or more LEDs are disposed on the printed circuit board such that the one or more LEDs illuminate the light transmissive cover when illuminated.

12. The wireless communication device of claim 11:

wherein the printed circuit board comprises a planar printed circuit board having a first surface and a second surface transversely opposed across a thickness of the printed circuit board from the first surface; and wherein the counterpoise comprises a circular counterpoise having an external perimeter disposed on the first surface of the printed circuit board.

13. The wireless communication device of claim 12 wherein the second antenna is disposed about at least a portion of the external perimeter of the counterpoise.

14. The wireless communication device of claim 13 wherein the second antenna comprises a plurality of sections conductively coupled via one or more jumpers.

* * * * *